G. W. BROWN.
Corn-Planter.
No. 1,093. Reissued Dec. 11, 1860
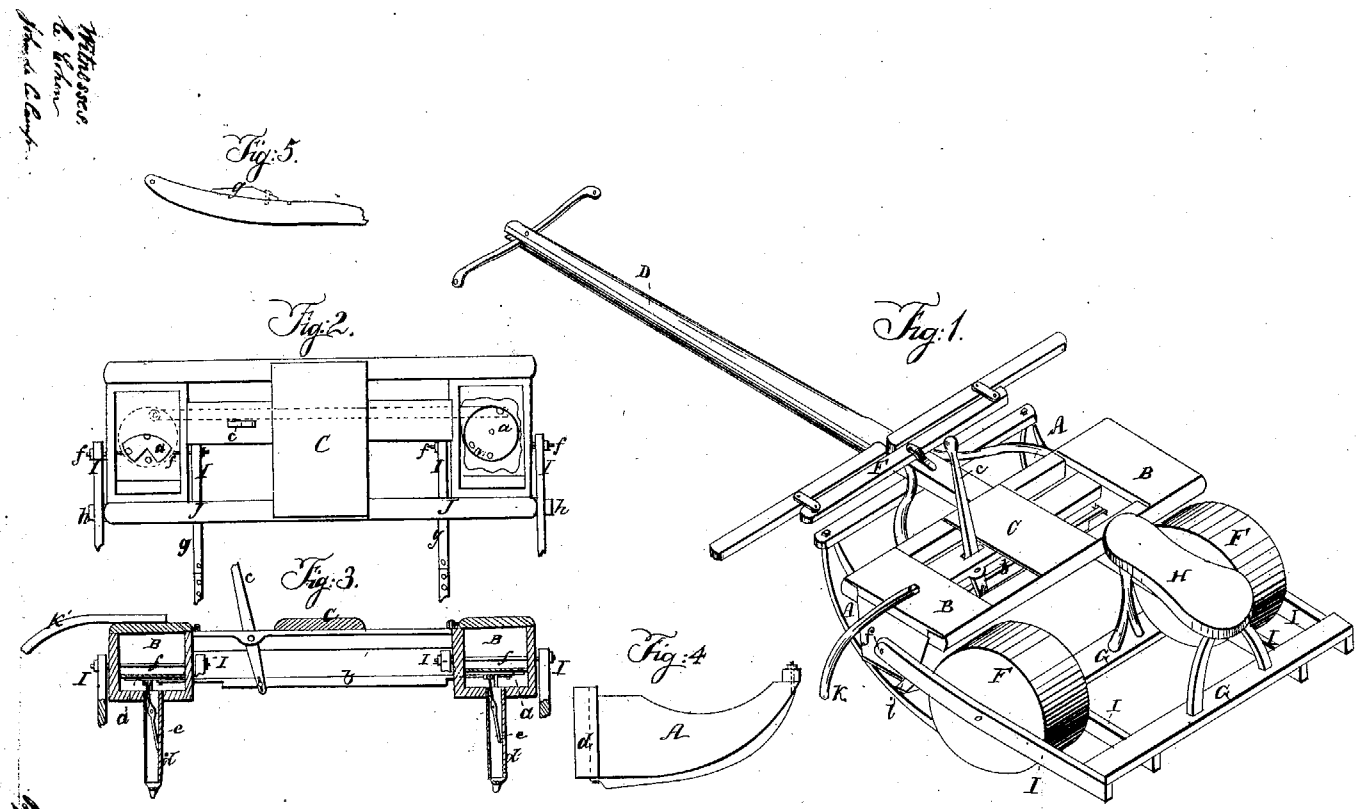
Witnesses.
C. Cohen
John de C. Campt.
Inventor:
Geo W. Brown
By atty. A. P. Stoughton
N. PETERS, PHOTO-LITHOGRAPHER, WASHINGTON, D. C.

UNITED STATES PATENT OFFICE.

GEO. W. BROWN, OF GALESBURG, ILLINOIS.

IMPROVEMENT IN SEED-PLANTERS.

Specification forming part of Letters Patent No. 12,811, dated May 8, 1855; Reissue No. 508, dated November 10, 1857; Reissue No. 1,693, dated December 11, 1860.

DIVISION C.

*To all whom it may concern:*

Be it known that I, GEORGE W. BROWN, of Galesburg, in the county of Knox and State of Illinois, have invented certain new and useful Improvements in Seed-Planters; and I do hereby declare that the following is a full, clear, and exact description of the same, reference being had to the accompanying drawings, making a part of this specification, in which—

Figure 1 represents a perspective view of the machine complete. Fig. 2 represents a top plan of the seed hoppers and valves and frame-work supporting them. Fig. 3 represents a vertical transverse section through the seed hoppers, valves, and runners or shoes, and showing a device for operating the valves, also representing parts of the frame for supporting them, as well as the marker. Fig. 4 represents a side elevation of one of the runners. Fig. 5 represents the lock or block for defining or adjusting the descent of the rear part of the frame.

Similar letters of reference, where they occur in the several figures, denote corresponding parts of the machine in all the drawings.

When the operator of a seeding-machine walks upon the ground alongside of or behind the machine it is very easy for him, by means of a lever, to raise or hold up certain portions of the machine, he himself being one of the points of support; but when the operator is mounted upon the machine, then the support afforded by his person is lost, and other means must be resorted to to effect this object. To accomplish this object with the operator or attendant mounted upon the machine is the subject of this patent; and the nature of my invention consists in so constructing a seed-planting machine that has a hinged joint between its fixed points of support, and that has its seeding devices arranged between said fixed points also, as that the seeding devices may be raised up out of the ground by the conductor riding on the machine, and carried by or on the tongue or horses' necks and by the supporting or carrying wheels jointly.

To enable others skilled in the art to make and use my invention, I will proceed to describe the same with reference to the drawings.

A A represent a pair of runner-shaped shoes properly braced to each other, so as to form a frame-work for supporting the tongue D and double-trees E, to which the team is hitched, the seed-hoppers B B, the slides *a a*, cross-bar *b*, that connects them together, and the lever *c* for operating said slides. These runners have an upward-inclined edge, so as to climb up and over or cut or break through intervening obstructions in their path. They are, moreover, thin in front and gradually widening toward their rear ends, so as to slip easily and with little friction through the ground and not become clogged with earth, having very little earth to move laterally out of their path. They open a gash or furrow, into which the seed are dropped at stated intervals from the hoppers and in measured quantities. They hold open the gash or furrow until the seed are completely in it; and for this purpose I prefer to have seed-ducts *d* in the runners, and closed, so that they cannot clog up, especially in backing or in turning around.

F F are a pair of supporting-wheels, and, as a matter of economy, so arranged with regard to the seeding devices as to become covering or pressing wheels for the planted grain.

I I are longitudinal pieces in which the journals of the axles of the wheels (or a single axle may be used, if preferred) are supported.

G G are cross-pieces extending from and fastened to the side pieces to form a frame-work upon which the conductor of the machine is placed in a seat, H, and where he rides and manages the machine. This seat is so placed that a portion of it shall be behind the axle or centers of the wheels F F, to enable the occupant of said seat to move forward or backward thereon, or so that by throwing his weight forward or backward he may lower or raise up the seeding devices, or that part of the frame-work or machine to which they are connected, as follows: The front ends of the longitudinal pieces I I are pivoted to the front part of the frame-work by bolts *f* or otherwise, to form a joint on which they can play, and on the inside pieces, I I, are fastened a pair of purchase-blocks, *g g*, which take under the cross-piece J, Fig. 2, of the front frame-work, and thus define the extent of motion of one frame on the other. These purchase-blocks are made adjustable for the purpose of regulating this extent of motion of one frame on the other.

*h h* are locks, blocks, or stops on the frame of the seeding apparatus, which prevent the rear part, G, of the frame from descending so low as to strike the ground or incommode or inconvenience the occupant of the seat H.

C is a seat or location where a person may sit or stand and operate the seed-slides.

K is an indicator or pointer extending downward so that its point will move over or near to the previously-made marks or furrows. The occupant of the seat or stand C faces the marker or indicator K, with the lever *c* in his hand, and whenever the indicator points to or over the previously-made marks he moves his lever, and through it the seed slides or valves *a e*, and the measured or designated charges of grain are dropped into and through the seed tube or duct into the furrow. The slide or valve *e*, arranged in the seed duct or tube, is pivoted near its center, and is in an almost vertical position, and opens and closes both by a single operation of the lever *c*, thus saving the operator one-half of the labor required to work a slide or valve that must have two motions of the lever to open and close it, which is of great importance to him in his many duties.

There are two points in this machine that have unvarying positions or heights with regard to the ground — viz., the point of the tongue, as its height is defined by horses' necks, to which it is attached, and they standing of course upon the ground, and the journals or axle of the covering or supporting wheels F F as they roll on the ground, and between these fixed points the hinged connection between the front and rear part of the machine is made, so as to admit of raising or lowering the seeding devices.

Having thus fully described the nature and object of this part of my invention, what I claim under this patent is—

In combination with a seed-planting machine that has a hinged or yielding joint between its fixed points of support and with its seeding devices between said points, the so connecting of the parts between said fixed points of support as that that portion of the machine carrying the seeding devices may be raised up out of the ground by the attendant riding on the machine, and be carried by the tongue or horses' necks and the supporting-wheels, substantially as and for the purpose described.

GEO. W. BROWN.

Witnesses:
A. B. STOUGHTON,
E. COHEN.